United States Patent [19]
Doi et al.

[11] 3,963,509
[45] June 15, 1976

[54] ASPHALT HAVING HIGH ADHESION STRENGTH AND ITS PREPARATION

[75] Inventors: Tadashi Doi, Osaka; Isao Sekido, Wakayama; Ryoichi Tamaki, Arita, all of Japan

[73] Assignee: Kao Soap Co., Ltd., Tokyo, Japan

[22] Filed: Jan. 13, 1975

[21] Appl. No.: 540,695

Related U.S. Application Data

[63] Continuation of Ser. No. 415,982, Nov. 15, 1973, abandoned.

[30] Foreign Application Priority Data

Nov. 20, 1972 Japan.............................. 47-116448

[52] U.S. Cl. ..................... 106/273 R; 106/281 R
[51] Int. Cl.² .......................................... C08L 95/00
[58] Field of Search............... 106/273 R, 282, 281; 260/438.5 R, 438.5 C

[56] References Cited
UNITED STATES PATENTS

| | | | |
|---|---|---|---|
| 2,090,577 | 8/1937 | Dillehay........................ | 106/273 R |
| 2,552,910 | 5/1951 | Steinman ...................... | 106/273 R |
| 2,795,609 | 6/1957 | Jensen............................ | 106/273 R |
| 2,796,375 | 6/1957 | Winslow........................ | 106/273 R |

OTHER PUBLICATIONS
"Metal–Organic Compounds–Advances in Chemistry Series 23," American Chemical Society, Washington, D.C., 1959, pp. 338–345, 353–355.

*Primary Examiner*—Paul R. Michl
*Attorney, Agent, or Firm*—Woodhams, Blanchard and Flynn

[57] ABSTRACT

Asphalt having a high adhesion strength is prepared by incorporating in asphalt a small amount of monocarboxylic chromic chloride expressed by the following general formula:

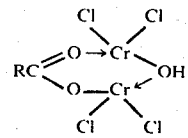

wherein R is an alkyl or alkenyl group having 1 to 21 carbon atoms, as an antistripping agent.

3 Claims, 1 Drawing Figure

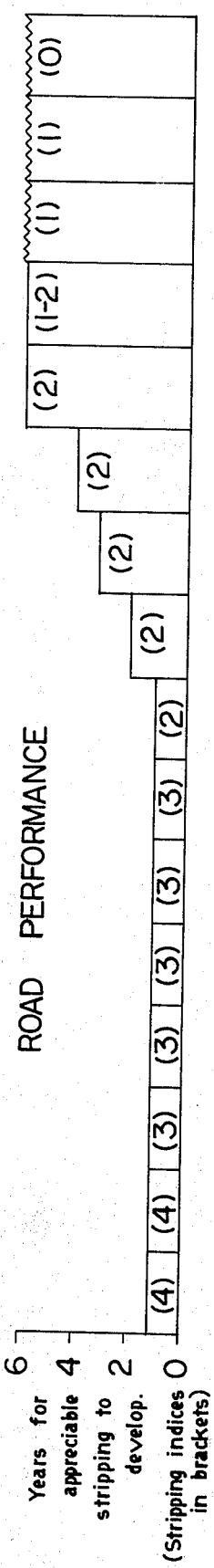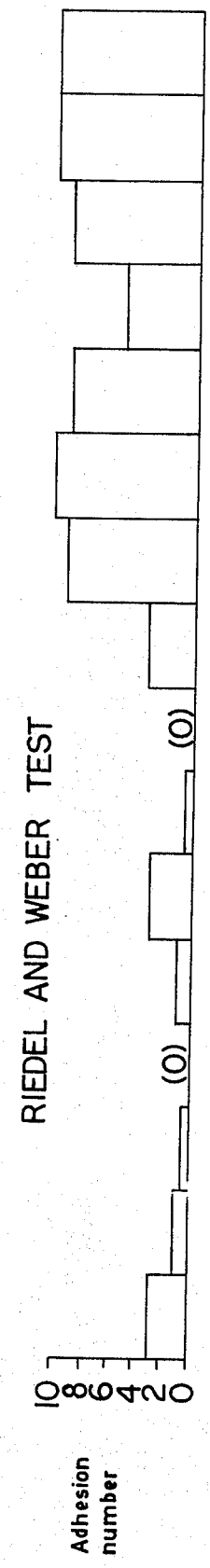

ASPHALT HAVING HIGH ADHESION STRENGTH AND ITS PREPARATION

This is a continuation, of application Ser. No. 415,982, filed Nov. 15, 1973, now abandoned.

BACKGROUND OF THE INVENTION

1. Field of the Invention

This invention relates to asphalt having a high adhesion strength and its preparation. Particularly, it relates to a novel asphalt additive for imparting to asphalt a high adhesion strength when the additive is incorporated in asphalt in a small amount.

2. Description of the Prior Art

It is known that, in case asphalt is used for pavement, it is necessary to attain a sufficient adhesion between an aggregate such as crushed stone or sand and asphalt.

However, since the surface of such aggregate to which asphalt is applied is generally hydrophilic, if it is wet with water, it is difficult to stick asphalt to such aggregate. Further, even if asphalt is once coated to the aggregate, it is stripped off by an action of rain water, underground water and water contained in the aggregate per se. This is the defect of asphalt as regards its general properties.

In asphalt-paved roads, as the degree of the stripping of asphalt is advanced, necessity of repair works such as overlaying is increased, resulting in apparent economical disadvantages. Thus, occurrence of stripping of asphalt gives great influences to the durability of paved roads.

Diamines and imidazoline compounds have heretofore been mainly used as antistripping agents or adhesion agents for improving the adhesion property of asphalt.

However, these compounds fail to impart a practically sufficient adhesive strength. More specifically, the period during which the effect of these compounds is sustainable is generally about 3 years when they are used in amounts of 2.0% by weight based on asphalt.

BRIEF DESCRIPTION OF DRAWING

The drawing is a diagram illustrating the relation between the adhesion number of asphalt by RIEDEL & WEBER TEST and the stripping property of asphalt observed at the road performance.

SUMMARY OF THE INVENTION

We have made extensive research works with a view to discovering an asphalt additive superior to the conventional additives and capable of imparting a high adhesion property to asphalt and have found that saturated or unsaturated aliphatic monocarboxylic chromic chloride expressed by the following general formula meet fully the above object;

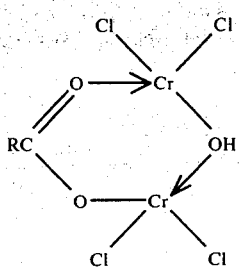

wherein R is an alkyl or alkenyl group having 1 to 21 carbon atoms.

As examples of the compounds expressed by the above general formula, there may be mentioned chromic chloride acetate, chromic chloride propionate, chromic chloride butyrate, chromic chloride caproate, chromic chloride caprylate, chromic chloride laurate, chromic chloride myristate, chromic chloride palmitate, chromic chloride stearate, chromic chloride oleate, chromic chloride linoleate, chromic chloride aranchate, chromic chloride behenate, chromic chloride acrylate, chromic chloride methacrylate, and chromic chloride crotonate.

These compounds can be obtained by reacting a monocarboxylic acid expressed by the general formula RCOOH, wherein R is an alkyl or alkenyl group having 1 to 21 carbon atoms, with a basic chromium dichloride, and generally the reaction proceeds as expressed by the following equation:

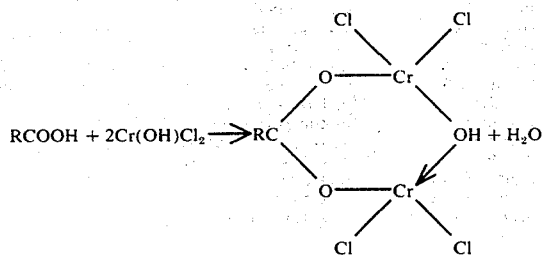

The British Road Research Institute has published indoor tests corresponding to actual road tests (road performance), and the Riedel & Weber Test is among these indoor tests. This Riedel & Weber Test is very simple, and results of this indoor test agree relatively well with results of the road performance. The effects of this invention were, therefore, confirmed according to this Riedel & Weber Test.

The Riedel & Weber Test is conducted in the following manner. Forty-three parts by weight of an aggregate having a particle size of 0.15 to 0.074 mm are mixed with 43 parts by weight of an aggregate having a particle size of 0.3 to 0.15 mm, and the mixture is heated to 170°C. Then, 14 parts by weight of asphalt heated and molten at 150°C are added to the heated aggregate mixture, and then the blend is mixed well to coat the aggregate completely with the asphalt. Then, 0.5 g of the resulting coated aggregate is added to a beaker charged with 25 ml of a sodium carbonate solution having the prescribed concentration as shown below, and the solution is boiled for 1 minute. A solution of a lowest concentration in which even a small amount of the asphalt is stripped completely from the aggregate for the first time is recorded to determine the adhesion number. The relation between the sodium carbonate concentration at which separation of clean aggregate particles first occurs and the adhesion number is as follows:

| Sodium carbonate concentration (molar concentration) | Adhesion number |
|---|---|
| 0 | 0 |
| 1/256 | 1 |
| 1/128 | 2 |
| 1/64 | 3 |
| 1/32 | 4 |
| 1/16 | 5 |
| 1/8 | 6 |
| 1/4 | 7 |
| 1/2 | 8 |
| 1 | 9 |

In case no stripping occurs in the sample at a sodium carbonate concentration of 1 M, the adhesion number of the sample is 10.

The relation between this adhesion number and the degree of stripping observed at the actual road test, which is shown by the stripping index, is as shown in the drawing. From the drawing, it will readily be understood that the adhesion number determined by the above method is directly proportional to the stripping property of asphalt shown by the stripping index.

In the drawing, symbols A, B, C and D indicate the kinds of aggregates used in adhesion tests, details of which are as follows:

| | |
|---|---|
| Basalt A | spilitic basalt |
| Basalt B | albitized olivine-dolerite |
| Basalt C | olivine-dolerate with analcite |
| Basalt D | quarz-dolerite |
| Granite A | soda granite |
| Granite B | granophyric diorite |
| Gritstone A | porphyritic breccia |
| Gritstone B | greywacke |
| Hornfels A | diabase hornfels |
| Porphyry A | biotite porphyrite |
| Porphyry B | pyroxene-granophyre |
| Porphyry C | quarz-diorite-porphyrite |
| Flint gravel A | flint gravel |
| Limestone A | limestone |
| Slag A | blast furnace slag |

Further, the stripping indices in brackets in the drawing show the following degrees of stripping, respectively:

0: no stripping
1: slightly stripped
2: considerably stripped
3: very drastically stripped
4: completely stripped In the actual road pavement, river sand is used. Since the size of river sand is small, the surface area of river sand occupies the greatest proportion of the total surface area of the aggregate.

Accordingly, when the adhesion numbers of the gritstone in the drawing are examined, it is seen that in case the adhesion number is 6 or more, stripping does not occur within 6 years.

According to the present presentation, there can be obtained an asphalt having an excellent antistripping effect as well as a high adhesion strength.

It is generally preferred that the monocarboxylic chromic chloride of the present invention is added in an amount of 0.3 to 2% by weight based on the amount of asphalt.

This invention will now be illustrated by reference to Example.

EXAMPLE

The above-mentioned Riedel & Weber test was conducted by employing river sand produced at Kinokawa and asphalt having a penetration of 60 to 80. Results are shown in Table 1.

Table 1

| | Antistripping agent | Amount added (% by weight) | Adhesion number |
|---|---|---|---|
| Examples of the present invention | Chromic chloride acetate | 2.0 | 6 |
| | Chromic chloride propionate | 2.0 | 6 |
| | Chromic chloride caproate | 2.0 | 10 |
| | Chromic chloride caprylate | 2.0 | 10 |
| | Chromic chloride laurate | 2.0 | 10 |
| | Chromic chloride palmitate | 2.0 | 10 |
| | Chromic chloride stearate | 2.0 | 10 |
| | Chromic chloride stearate | 0.3 | 4 |
| | Chromic chloride oleate | 2.0 | 10 |
| | Chromic chloride behenate | 2.0 | 10 |
| | Chromic chloride acrylate | 2.0 | 6 |
| | Chromic chloride methacrylate | 2.0 | 6 |
| | Chromic chloride crotonate | 2.0 | 6 |
| Comparative Examples | Not added | 0 | 1 |
| | Stearic acid | 2.0 | 0 |
| | Magnesium stearate | 2.0 | 1 |
| | Calcium stearate | 2.0 | 1 |
| | Aluminium stearate | 2.0 | 1 |
| | Zinc stearate | 2.0 | 1 |
| | Cadmium stearate | 2.0 | 1 |
| | Beef-tallow-alkyl propylenediamine | 2.0 | 2-3 |
| | Adduct of 1 mole of beef-tallow-alkyl propylenediamine and 3 moles of ethylene oxide | 2.0 | 2-3 |
| | Oleate of adduct of 1 mole of beef-tallow-alkyl propylenediamine and 3 moles of ethylene oxide | 2.0 | 2-3 |
| | 1-aminoethyl-2-heptadecenyl-imidazoline-2 | 2.0 | 2-3 |

From the above test results, it will readily be understood that the monocarboxylic chromic chloride of this invention exhibit a very excellent antistripping effect.

The embodiments of the invention in which an exclusive property or privilege is claimed are defined as follows:

1. An asphalt road-paving composition consisting essentially of road-paving aggregate selected from the group consisting of crushed stone and sand, mixed and coated with an asphalt composition consisting essentially of road-paving asphalt and 0.3 to 2% by weight, based on the weight of asphalt, of a monocarboxylic chromic chloride having the formula:

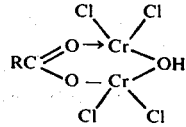

wherein R is alkyl or alkenyl having 1 to 21 carbon atoms.

2. A road pavement consisting essentially of the asphalt roadpaving composition of claim 1.

3. An asphalt composition according to claim 1, in which said monocarboxylic chromic chloride is selected from the group consisting of chromic chloride acetate, chromic chloride propionate, chromic chloride butyrate, chromic chloride caproate, chromic chloride caprylate, chromic chloride laurate, chromic chloride myristate, chromic chloride palmitate, chromic chloride stearate, chromic chloride oleate, chromic chloride linoleate, chromic chloride aranchate, chromic chloride behenate, chromic chloride acrylate, chromic chloride methacrylate, and chromic chloride crotonate.

* * * * *